United States Patent [19]

Harben, Jr.

[11] 4,179,772
[45] Dec. 25, 1979

[54] DRUM/DISK POULTRY PICKER

[76] Inventor: Grover S. Harben, Jr., Edgewater Ave., Gainesville, Ga. 30501

[21] Appl. No.: 874,844

[22] Filed: Feb. 3, 1978

[51] Int. Cl.² ............................................. A22C 21/02
[52] U.S. Cl. ..................................... 17/47; 17/11.1 R
[58] Field of Search ............................... 17/11.1 R, 47

[56] References Cited

U.S. PATENT DOCUMENTS

| | | | |
|---|---|---|---|
| 3,235,904 | 2/1966 | Brown et al. | 17/11.1 R |
| 3,599,278 | 8/1971 | Crane | 17/11.1 R |
| 3,747,159 | 7/1973 | Harben, Jr. | 17/11.1 R |

*Primary Examiner*—Willie G. Abercrombie
*Attorney, Agent, or Firm*—B. J. Powell

[57] ABSTRACT

This invention relates to poultry picking machines and more particularly to a poultry picking machine for removing the feathers from fowl with multiple finger action using a first plurality of picking fingers rotatable about axes of rotation extending generally transversely of the path of travel of the fowl through the machine and with a second plurality of picking fingers rotating about axes extending generally parallel to the path of travel of the fowl through the machine so that the first plurality of picking fingers is located on one side of the path of travel while the second plurality of picking fingers is located on the opposite side of the path of travel.

9 Claims, 4 Drawing Figures

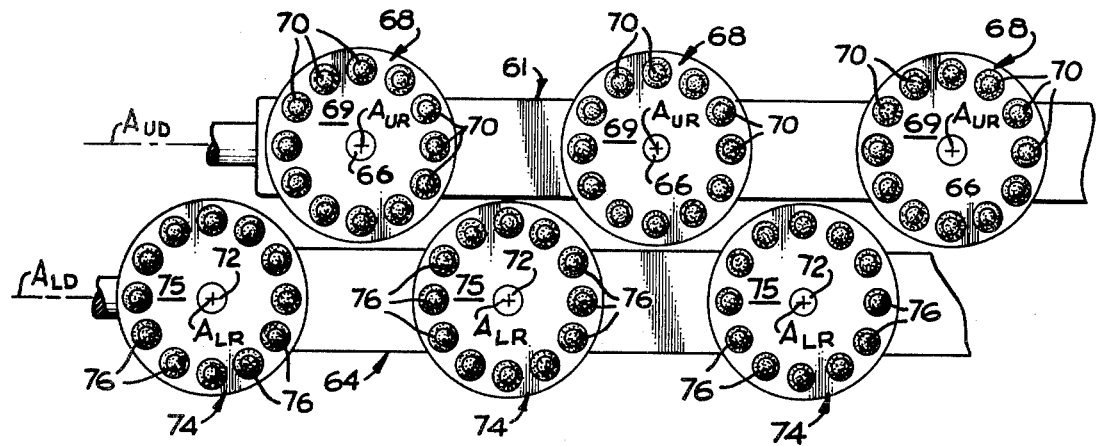
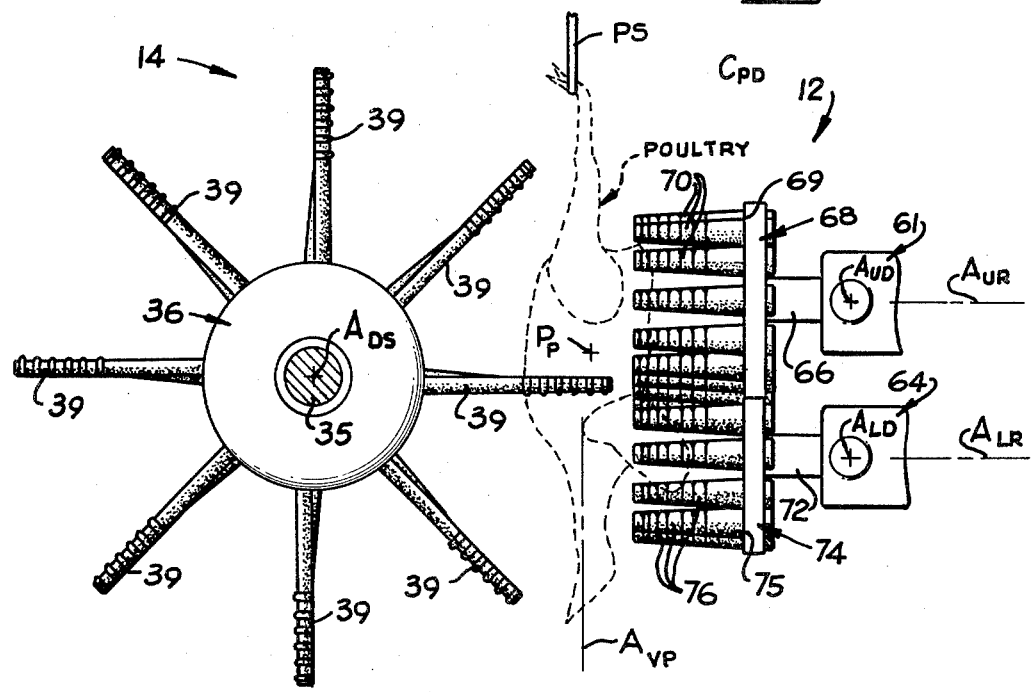

DRUM/DISK POULTRY PICKER

BACKGROUND OF THE INVENTION

Broadly speaking, prior art poultry picking machines fall in two general categories. One category is the rotary drum type picking machine which employs a plurality of rotating drums having a plurality of flexible rubber picking fingers extending from the periphery of the drum normal to the drum rotation axis to engage and defeather the poultry passing adjacent thereto. The other type is the disk type picking machine which employs a plurality of rotating disks that mount a plurality of flexible rubber picking fingers thereon extending from the face of the disk generally parallel to the rotation axis of the disk. U.S. Pat. Nos. 3,044,108 and 3,074,103 illustrate the rotary drum type picking machine while U.S. Pat. Nos. 3,197,809; 3,402,424 and 3,483,589 illustrate the disk type picking machine.

While a number of different angular arrangements of the different types of picking machines have been proposed, such picking machines have, by in large, used opposed sets of picking fingers on opposite sides of the path of travel of the poultry through the machine which were of the same general arrangement. In other words, when rotary drum type chicken picking arrangements were used, this same type arrangement was used on opposite sides of the path of travel through the machine and when the disk type picking arrangement was used, this same type arrangement was used on opposite sides of the path of travel of the poultry through the machine. While each of these types of picking machines has certain advantages, they also have accompanying limitations and disadvantages. For instance, a drum type picking arrangement is able to defeather hard to reach areas of the poultry such as the straddle but are usually not able, when used in opposed sets to get full defeathering coverage without damage to the body of the poultry. The disk type arrangement is able to get more coverage of the poultry without damage to the body of the poultry but is usually not able, when used in opposed sets, to defeather the hard to reach areas and is also difficult to feed the poultry through this arrangement. As a result, it has usually been necessary to use a series of different types of machines, some of which were rotary drum type picking machines while others were disk type picking machines in order to effectuate the desired defeathering of the poultry. This has not only caused the equipment cost to remain high for such poultry defeathering operations because of the number of different types of machines required, but further required considerable floor space within the poultry processing plant to make room for the different types of machines.

SUMMARY OF THE INVENTION

These and other problems and disadvantages associated with the prior art are overcome by the invention disclosed herein by providing a poultry picking or defeathering machine which incorporates the advantages of both of the different general types of prior art poultry picking machines without the disadvantages and limitations associated therewith so as not to require the use of a series of different type machines as required by the prior art to effectuate the desired defeathering operation thereby minimizing the problems of feeding the poultry therethrough, the equipment cost required to carry out an adequate poultry defeathering operation, and the amount of floor space required to effectively defeather poultry.

The apparatus of the invention includes a poultry picking machine which uses a plurality of resilient rubber poultry picking fingers oriented in a disk type arrangement on one side of the poultry picking path while providing another plurality of resilient rubber poultry picking fingers arranged in a rotary drum type poultry picking arrangement on the opposite side of the path along which the poultry is moved through the machine and in opposition to the first plurality of picking fingers. Because the poultry is relatively free to move about within the defeathering channel along which the poultry moves on an overhead conveyor, the poultry is able to rotate about its longitudinal generally vertical axis so that all the sides of the poultry are exposed to the different types of picking finger arrangements in order that thorough picking or defeathering of the fowl is accomplished as the poultry moves through the machine.

These and other features and advantages disclosed herein will become more fully understood upon consideration of the following specifications and accompanying drawings wherein like characters of reference designate corresponding parts throughout the several use and in which:

BRIEF DESCRIPTION OF THE DRAWINGS

FIG. 3 is an enlarged partial longitudinal cross-sectional view taken generally along line 3—3 in FIGS. 1 and 2 and showing a face view of the disk type poultry picking finger arrangement; and, FIG. 4 is an enlarged transverse cross-sectional view taken generally along line 4—4 in FIGS. 1 and 2.

Figure 1:
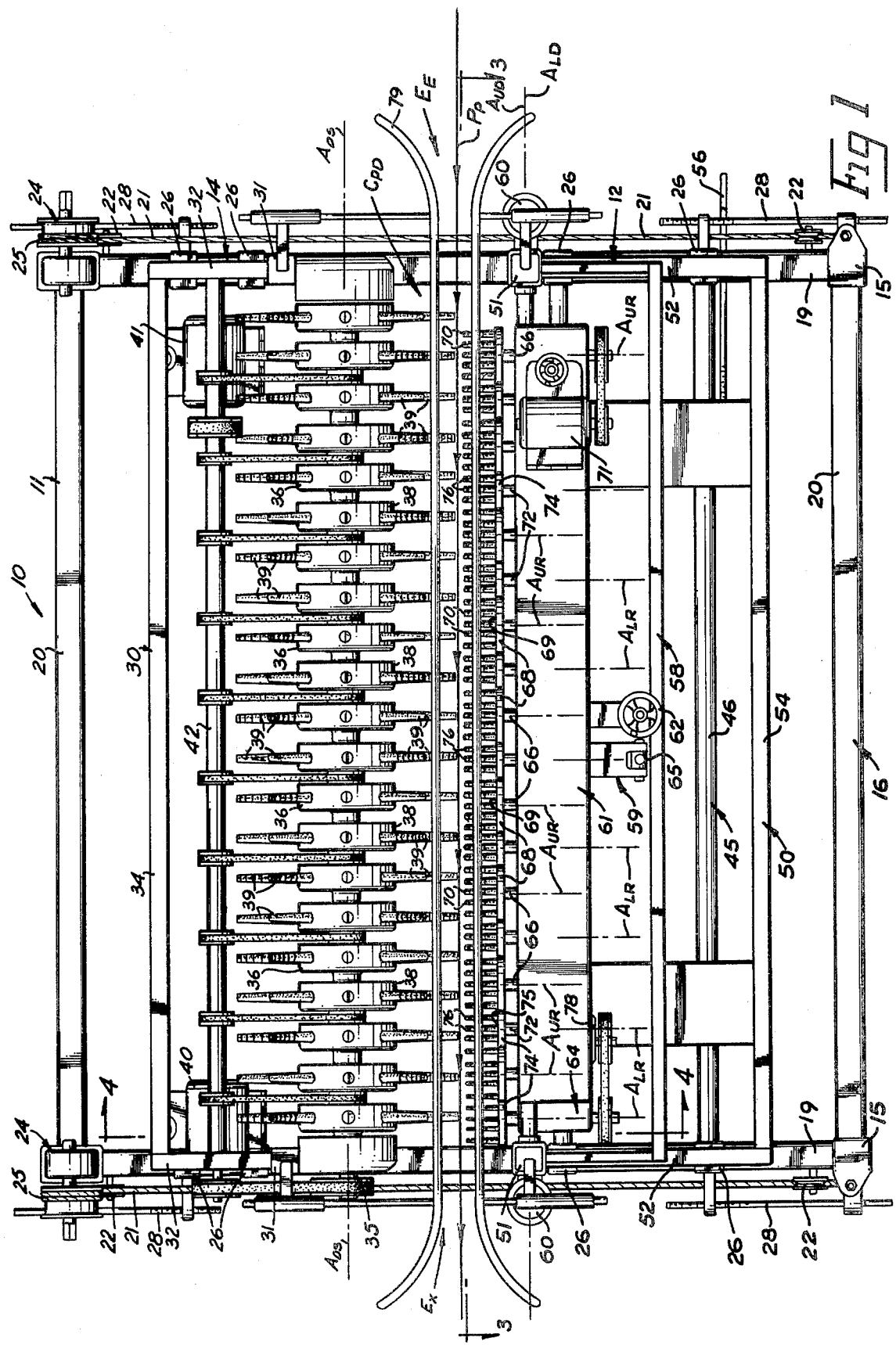
FIG. 1 is a top plan view of a poultry picking machine embodying the invention.
Figure 2:
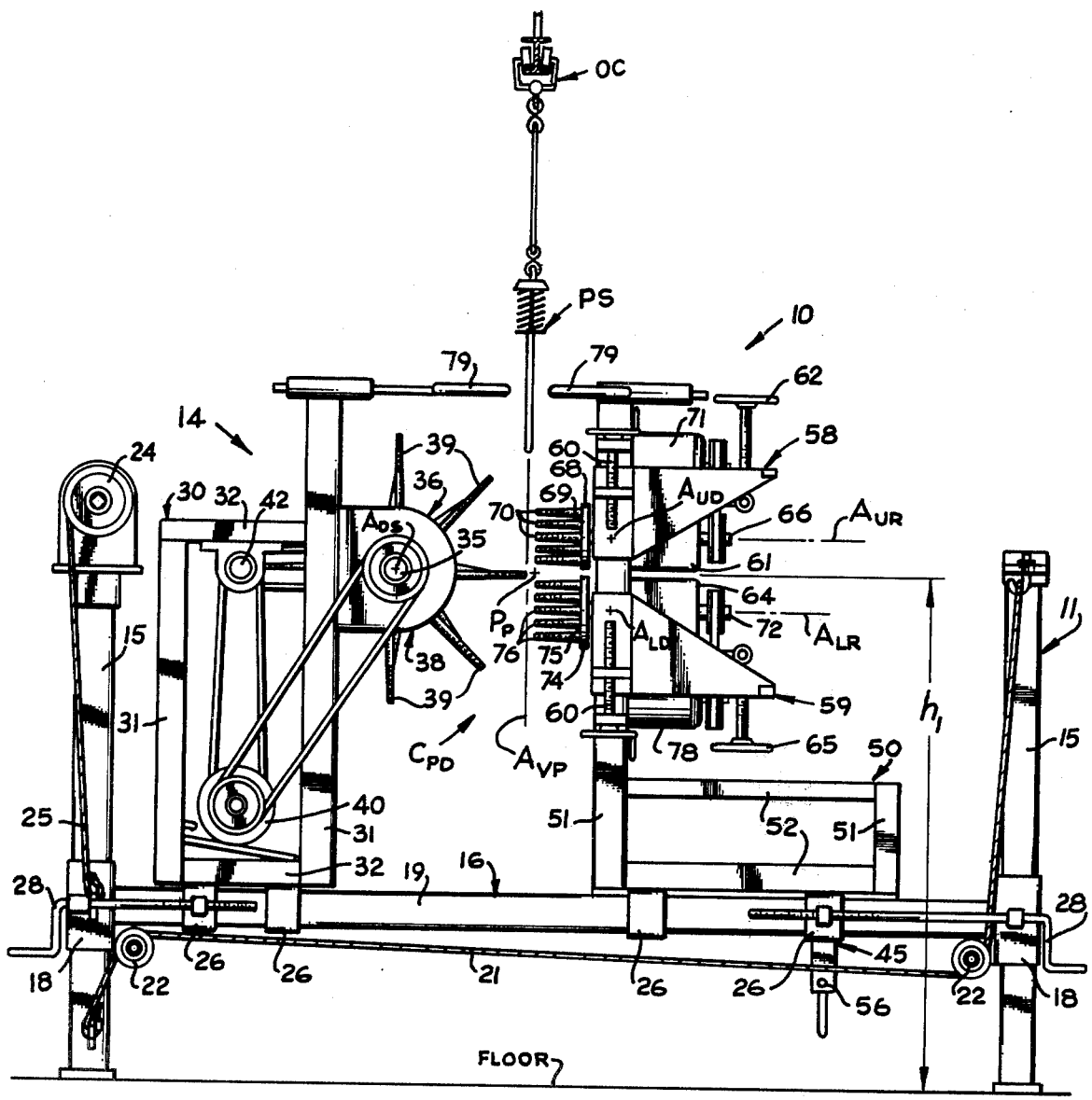
FIG. 2 is an end view of the machine of FIG. 1.

The figures in the following detailed description disclose specific embodiments of the invention; however, it is to be understood that the inventive concept is not limited thereto since it may be embodied in other forms.

DETAILED DESCRIPTION OF ILLUSTRATIVE EMBODIMENTS

Referring to the figures, it will be seen that the poultry picking machine 10 has an entrance and $E_e$ and an exit end $E_x$, and includes generally a main frame 11 which mounts a pair of opposed picking units 12 and 14 thereon to define a poultry defeathering channel $C_{PD}$ therebetween. The picking unit 12 is a disk type picking unit while the picking unit 14 is a drum type picking unit. It will also be seen from the figures that the poultry is suspended in a head lowermost position from an overhead conveyor OC through poultry shackles PS so that the poultry is flexibly supported from the overhead conveyor OC and successively move along the conveyor. The poultry is moved in this head lowermost position along a prescribed path $P_P$ so that the poultry is generally vertically oriented a prescribed distance h, above the processing plant floor. The shackles PS support the poultry so that limited rotation of the body of the bird about the vertical axis along which it is suspended is permitted. The picking machine 10 is oriented so that the prescribed path $P_P$ along which the poultry is successively conveyed passes through the defeathering channel $C_{PD}$ between the picking units 12 and 14.

The main frame 11 includes corner posts 15 generally verticaly oriented and which set on the processing plant floor to support the machine 10. A rectangular tubular frame 16 is movably mounted on the posts 15 by appropriate sleeves 18 at the corners of the frame 16 so that the frame 16 can slide up and down the posts 15. The frame 16 has opposed end tubes 19 and opposed side tubes 20 which extend between the sleeves 18 and serve to define the outer periphery of the machine. The tubular frame 16 is vertically adjustable to adjust the height of the picking units 12 and 14 above the processing plant floor so that the picking units 12 and 14 can be vertically aligned with path $P_P$. The pair of posts 15 at each end of the machine are provided with a flexible guide member 21 which is connected to both sides of the tubular frame 16 through appropriate guide rollers 22 so that the tubular frame 16 is maintained level as it is raised and lowered. This arrangement is conventional. The height of the tubular frame 16 is adjusted by a windlass 24 mounted on top of one of the corner posts 15 at each end of the machine and appropriately connected to the tubular frame 16 by a flexible lift member 25. This arrangement is also conventional.

Normally, one or both of the picking units 12 and 14 are slidably mounted on the end tubes 19 for movement of the picking units 12 and 14 toward and away from the picking path $P_P$ to laterally adjust the picking units 12 and 14 with respect to the poultry passing along the path $P_P$. Both of the units 12 and 14 are illustrated as adjustably mounted on the end tubes 19 by slide collars 26. Each of the picking units 12 and 14 is provided with a conventional adjustment mechanism 28 at each of the end tubes 19 so that the picking units 12 and 14 can be independently adjusted laterally of the picking path $P_P$ in a manner well known in the poultry picking art.

The picking unit 12 is a disk type picking unit while the picking unit 14 is a drum type picking unit. The disk picking unit 12 provides the short circular picking action of disk type pickers to partially defeather the poultry without subjecting the poultry to bruising or burning since the different parts of the poultry are engaged and released over a short distance. The drum picking unit 14 provides the longer generally linear picking action of drum type pickers so that the different recessed areas of the body of the poultry are defeathered which are not usually removed in a disk type picker.

The drum picking unit 14 includes a drum picking frame 30 which is mounted on the main frame 11 through the collars 26 so that the picking frame 30 is generally longitudinally parallel with the path $P_P$ of the poultry through the picking machine. The drum picking frame 30 includes a pair of upright corner members 31 at each end thereof with each pair of upright members 31 joined by top and bottom cross members 32. Longitudinal side members 34 connect the pairs of upright members 31 and cross members 32 to form a rectilinear frame. The bottom cross members 32 at each end of the drum picking frame 30 are mounted on the collars 26 so that the drum picking frame 30 is movable transversely of picking path $P_P$ of the poultry through the machine by the lateral adjustment mechanisms 28.

The upright members 31 adjacent the picking path $P_P$ rotatably journal a main drum shaft 35 about a rotational axis $A_{DS}$ generally parallel to the picking path $P_P$ of the poultry through the machine. The main drum shaft 35 mounts a plurality of circular finger drums 36 and 38 thereon with the drums 36 and 38 alternating on the shaft 35. The finger drums 36 are fixedly keyed to the main drum shaft 35 so that the drums 36 rotate with the drum shaft 35. The finger drums 38 are rotatably mounted on the drum shaft 35 on appropriate bearings so that the drums 38 are free to rotate with respect to the drum shaft 35. The finger drums 36 and 38 are of the same size and mount a plurality of resilient rubber picking fingers 39 in the periphery thereof which extend outwardly from the periphery of the drums 36 and 38 generally radially with respect thereto. The picking fingers 39 are of the general type used on drum type picking arrangements. The fingers 39 are usually about 5-6 inches long and more flexible in a direction circumferential of the drums 36 and 38 than in a direction axially of the shaft 35. The main drum shaft 35 is driven by a drive motor 40 in one rotational direction to drive the circular drums 36 keyed thereto in that same rotational direction while the circular drums 38 are driven by a drive motor 41 through a jack shaft 42 independently of the drive motor 40 so that the circular drums 38 may be rotatably driven in the opposite rotational direction from the circular drums 36. Thus, it will be seen that the picking unit 14 is a rotary drum type picking unit with counter rotating drums.

The disk picking unit 12 is mounted on a longitudinal adjustment subframe 45 which has longitudinally extending side members 46 that mount the disk picking unit 12. The subframe 45 is mounted on the collars 46 so that the subframe 45 is adjustable in a direction generally transversely of the picking path $P_P$ along which the poultry passes through the transverse adjustment mechanisms 28 attached thereto.

The picking unit 12 includes a disk picking frame 50 with corner upright members 51 joined by upper and lower end cross members 52 and longitudinally extending side members 54 to form a generally rectilinear frame. The disk picking frame 50 is slidably connected to the side members 46 of the longitudinal adjustment subframe 45 by appropriate slide collars 55 so that the disk picking frame 50 can be longitudinally adjusted along the subframe 45 on a path generally parallel to the picking path $P_P$ of the poultry through a longitudinal adjustment mechanism 56 while the disk picking frame 50 along with the longitudinal adjustment subframe 45 can be transversely adjusted with respect with transverse adjustment mechanisms 28 to the picking path $P_P$.

The inboard upright members 51 of the disk picking frame 50 slidably mount on upper picking subframe 58 and a lower picking subframe 59 therebetween so that the respective heights of the upper and lower picking subframes 58 and 59 can be adjusted with respect to the disk picking frame 50. Appropriate height adjustment mechanisms 60 are provided on each of the subframes 58 and 59 so that height of the upper and lower picking subframes 58 and 59 can be independently adjusted with respect to the processing plant floor.

An upper disk drive unit 61 is pivotally mounted on the upper picking subframe 58 about a pivot axis $A_{UD}$ generally parallel to the picking path $P_P$ through the machine and is provided with an appropriate angle adjustment mechanism 62 connected to subframe 58 to selectively control the rotational position of the upper disk drive unit 61 about axis $A_{UD}$. A lower disk drive unit 64 is pivotally mounted on the lower picking subframe 59 about a pivot axis $A_{LD}$ which is also generally parallel to the upper pivot axis $A_{UD}$ and the picking path $P_P$ through the machine. The lower disk drive unit 64 is provided with an appropriate angle adjustment mechanism 65 connected to subframe 59 which controls the pivotal position of the lower disk drive unit 64 about the axis $A_{LD}$.

The upper disk drive unit 61 rotatably mounts a plurality of upper disk support shafts 66 at spaced apart positions along the length of the upper disk drive unit 61 so that the support shafts 66 rotate about upper disk axes $A_{UR}$ which are normal to the pivot axis $A_{UD}$ and the picking path $P_P$ and fixed with respect to the upper disk drive unit 62 so that the upper disk rotational axes $A_{UR}$ can pivot about the upper pivot axis $A_{UD}$. The upper disk supports shafts 66 project inwardly toward the picking path $P_P$ of the poultry through the machine and each mounts on the inboard end thereof an upper picking disk 68 which is fixed to the support shaft 66 so that the inboard face 69 of each of the upper picking disks 68 is generally normal to the disk rotational axis $A_{UR}$ and all of the inboard faces 69 of the upper picking disks 68 lie in a common plane generally parallel to the picking path $P_P$ of the poultry through the machine.

Each of the upper picking disks 68 mount a plurality of upper resilient rubber picking fingers 70 which are circumferentially spaced about the inboard face 69 of each of the disks 68 and project inwardly from the disk 68 generally normal to the inboard face 69 thereof. The picking fingers 70 are of the type generally associated with disk type picking arrangements with about the same flexibility in all directions normal to the finger axis and with a length of about 3–4 inches. Thus, it will be seen that the upper picking fingers 70 are arranged so that they operate in accordance with a disk type picking machine.

An upper drive motor 71 is appropriately connected to the upper disk drive unit 61 to rotate the upper picking disks 68 in a common rotational direction. The upper disk drive unit 61 may be any appropriate arrangement to transfer the rotation of the motor 71 to the picking disks 68. One type of arrangement which would be adequate in this regard is a belt drive common to many of the prior art poultry chicken picking machines such as that illustrated in U.S. Pat. No. 3,402,414. Another type arrangement is a gear drive such as that illustrated in U.S. Pat. No. 3,551,942.

It will thus be seen that the upper picking fingers 70 are rotated about the rotational axes $A_{UR}$ to pick the poultry in opposition to the drum picking unit 14 in accordance with the picking principals associated with disk type pickers. It will also be noted that the upper picking disks 68 can be transversely moved toward and away from the picking path $P_P$ of the poultry through the machine using the transverse adjustment mechanisms 28 to adjust the position of the subframe 45, may be adjusted longitudinally of the poultry picking path $P_P$ using the longitudinal adjustment mechanism 56 to move the disk picking frame 50 longitudinally of the subframe 45, may be adjusted as to height using the height adjusting mechanism 60 to raise and lower the upper picking subframe 58, and that the angle of the rotational axes $A_{UR}$ of the disks 68 with respect to the horizontal may be changed using the angle adjustment mechanism 62.

The lower disk drive unit 64 rotatably mounts a plurality of lower disk support shafts 72 at spaced apart positions along the length of the lower disk drive unit 64 so that the support shafts 72 rotate about lower disk axes $A_{LR}$ which are normal to the pivot axis $A_{LD}$ and the picking path $P_P$ and fixed with respect to the lower disk drive unit 64 so that the lower disk rotational axes $A_{LR}$ can pivot about the lower pivot axis $A_{LD}$. The lower disk support shafts 72 project inwardly toward the picking path $P_P$ of the poultry through the machine and each mounts on the inboard end thereof a lower picking disk 74 which is fixed to the support shaft 72 so that the inboard face 75 of each of the lower picking disks 74 is generally normal to the disk rotational axis $A_{LR}$ and all of the inboard faces 75 of the lower picking disks 74 lie in a common plane generally parallel to the picking path $P_P$ of the poultry through the machine. Each of the lower picking disks 74 mount a plurality of lower resilient rubber picking fingers 76 which are circumferentially spaced about the inboard face 75 of each of the disks 74 and project inwardly from the disk 74 generally normal to the inboard face 75 thereof. The fingers 76 have the same configuration as the fingers 70. Thus, it will be seen that the lower picking fingers 76 are arranged so that they operate in accordance with a disk type picking machine. A lower drive motor 78 is appropriately connected to the lower disk drive unit 64 to rotate the lower picking disks 74 in a common rotational direction. The lower disk drive unit 64, like the upper disk drive unit 61, may be any appropriate arrangement to transfer the rotation of the motor to the picking disks 74. The lower picking fingers 76 are also rotated about the rotational axes $A_{LR}$ to pick the poultry in opposition to the drum picking unit 14 in accordance with the picking principals associated with disk type pickers.

It will also be noted that the rotational axes $A_{LR}$ of the lower picking disks 74 are centered between the rotational axes $A_{UR}$ of the upper picking disks 68 longitudinally of the machine below the axes $A_{UR}$. This arrangement insures that the poultry will be gradually engaged and disengaged by the fingers 70 and 76 on the disks 68 and 74 yet the poultry will be engaged by the fingers 70 or 76 of the next downstream disks 68 or 74 before being completely disengaged by the picking fingers 70 or 76 of any particular disk 68 or 74. It will be further noted that the upper picking disks 68 may be rotated in one rotational direction while the lower picking disks 74 may be rotated in the opposite rotational direction.

The lower picking disks 74 can be transversely moved toward and away from the picking path $P_P$ of the poultry through the machine along with the upper picking disks 68 using the adjustment mechanisms 28 to adjust the position of the subframe 45 or may be adjusted longitudinally of the poultry picking path $P_P$ along with disks 68 using the longitudinal adjustment mechanism 56 to move the disk picking frame 50 longitudinally of the subframe 45. The lower picking disks 74 may be adjusted as to height independently of the upper disks 68 using the height adjusting mechanism 60 connected thereto to raise and lower the picking subframe 58, and the angle of the rotational axes $A_{LR}$ of the disks 74 with respect to the horizontal may be changed independently of that of disks 68 using the angle adjustment mechanism 65.

Appropriate shackle guides 79 are adjustably carried by the picking units 12 and 14 to guide the shackles PS along the poultry path $P_P$. The guides 79 are usually spaced so that the shackles PS track generally along the $P_P$ but limited side-to-side movement as well as limited rotational movement about the vertical shackle axis is permitted to allow the poultry to be completely defeathered without damage thereto.

OPERATION

In operation, it will be seen that the machine 10 is located under the overhead conveyor OC so that the path $P_P$ along which the poultry is moved on the poultry shackles PS lies generally over the longitudinal centerline of the main frame 11. Usually, the windlasses 24 are adjusted until the common rotational axis $A_{DS}$ of the drum type picking fingers 39 is generally located at the average poultry height $h_1$ above the poultry processing plant floor. The height adjustment mechanisms 60 connected to the upper and lower picking subframes 58 and 59 are adjusted so that the upper and lower disk type picking fingers 70 and 76 are generally in lateral alignment with the poultry moved by the overhead conveyor OC. The adjustment mechanisms 28 connected to the drum picking unit 14 are then adjusted to move the drum picking fingers 39 toward and away from the picking path $P_P$ until the drum picking fingers 39 will properly engage the poultry passing along the picking path $P_P$ on the shackles PS.

Similarly, the adjustment mechanisms 28 connected to the longitudinal subframe 45 are appropriately adjusted to move the upper and lower disk type picking fingers 70 and 76 toward and away from the poultry moving along the picking path $P_P$ until the fingers 70 and 76 properly engage the poultry for picking. The longitudinal adjustment mechanism 56 may be operated to longitudinally shift both the upper and lower disk type picking fingers 70 and 76 longitudinally of the drum type picking fingers 39 on the picking unit 14. Thus, it will be seen that, as the poultry is moved along the picking path $P_P$ through the machine from the entrance end $E_E$ to the exit end $E_X$, the poultry will be successively engaged by each set of the drum type picking fingers 39 and by each set of the upper and lower disk type picking fingers 70 and 76.

It will further be seen that the angle of the rotational axes $A_{UR}$ and $A_{LR}$ of the upper and lower disks 68 and 74 can be pivoted about the respective pivot axes $A_{UD}$ and $A_{LD}$ using the angle adjustment mechanisms 56 and 62. This permits the coverage of the poultry by the upper and lower disk type picking fingers 70 and 76 to be changed as required to effectively carry out the defeathering operation.

The shackle guide 79 will also be appropriately adjusted to limit the side to side movement of the shackles PS laterally of the picking path $P_P$ as the shackles move down the machine and/or limit the rotational movement of the shackles PS about the vertical axis $A_{VP}$ of the poultry. It will further be appreciated that the bone and muscle structure of the poultry permits the poultry itself to twist about the vertical axis $A_{VP}$ in addition to the pivoting of the shackles PS so that the poultry can pivot about 90° in a first direction about the axis $A_{VP}$ and also can pivot about 90° in the opposite direction about the vertical axis $A_{VP}$. Because of this, it will be seen that the poultry can rotate sufficiently about its vertical axis $A_{VP}$ so that substantially all of the poultry can be exposed to the different type picking finger arrangements.

It will be appreciated that the drum type picking fingers 39 are usually longer and more flexible in the plane of rotation of these picking fingers than the disk type picking fingers 70 and 76. Because of this, the drum type picking fingers 39 can reach areas of the poultry which cannot be reached by the fingers 70 and 76. This permits the longer drum type picking fingers 39 to reach those areas of the poultry such as the straddle and under the wing that are not normally capable of being picked by the picking fingers 70 and 76 without significantly damaging the bird. On the other hand, the shorter disk type picking fingers 70 and 76 traveling an angular path about axes generally normal to the picking path $P_P$ do not engage the poultry with a long single direction motion as is encountered when using the drum type picking fingers 39. Thus, it will be seen that the disk type picking fingers 70 and 76 are constantly changing direction in the forces being applied to the poultry by the picking fingers 70 and 76 so that the single directional force build-up normally associated with drum type pickers is not encountered. The combination of the drum type picking arrangement with the disk type picking arrangement results in enhanced defeathering of the poultry while at the same time engaging the poultry on opposite sides thereof with different motions so that the motion of each type picking arrangement is offset by the motion of the other type picking arrangement to more carefully cushion the poultry passing therethrough. The net result of this type arrangement is that the poultry can be acceptably defeathered without damage to the poultry as is frequently encountered with the prior art type picking machines. Further, the feeding problems normally associated with disk type pickers are eliminated.

What is claimed as invention is:

1. A poultry picking machine through which poultry are conveyed successively along a picking path in a head lowermost position so that the poultry is suspended along a generally vertical axis and the vertical axis moves with the poultry along a generally vertical picking plane along the picking path comprising:

a disk type picking arrangement including a plurality of disk support members disposed along and adjacent one side of the picking path and the vertical picking plane, each of said disk support members rotating about disk axes oriented generally normal to said path; and a plurality of flexible disk picking fingers mounted on each of said disk support members and projecting toward said picking path so that said flexible picking fingers are rotated with said disk support members in circular paths concentric about said disk axes to engage and defeather poultry successively moving along said picking path; and a drum type picking arrangement including a plurality of drum support members disposed along and adjacent the picking path on the opposite side of the vertical picking plane from said disk type picking arrangement, said drum support members rotating about a common drum axis generally parallel to and spaced outwardly of the picking path; and a plurality of flexible drum picking fingers mounted on each of said drum support members and movable with said drum support members about said common drum axis in a plane generally normal to the picking path and the vertical picking plane to engage the poultry in opposition to said disk picking fingers to defeather poultry passing along said picking path.

2. The poultry picking machine of claim 1 wherein said drum type picking arrangement further includes a first set of said drum support members and second set of said drum support members, both of said sets of said drum support members being rotatably mounted about said common drum axis; and drive means for rotating said first set of drum members in a first rotational direction about said common drum axis and for rotating said second set of said drum members in the opposite rotational direction from said first set of drum members, said drum members of said first set alternating with said drum members of said second set along said common drum rotational axis so that the poultry passing along said picking path will be alternately engaged by said drum picking fingers on one of said drums of said first set and then said drum picking fingers on one of said drums of said second set as said poultry moves along said picking path.

3. The poultry picking machine of claim 2 wherein said disk type arrangement futher includes an upper set of said disk support members rotating about an upper set of said disk axes, said upper set of said disk axes lying in an upper common plane, and a lower set of said disk support members rotating about a lower set of said disk axes lying in a lower common plane so that the upper and lower common planes of said disk axes are generally vertically spaced, said common drum axis of said drum type picking arrangement centered between said upper and lower common planes of said upper and lower sets of said disk support members transversely of the vertical picking plane.

4. The poultry picking machine of claim 3 wherein said upper set of said disk support members rotate in one rotational direction and wherein said lower set of said disk support members rotate in the opposite rotational direction.

5. The poultry picking machine of claim 4 further including a main support frame; a disk picking frame mounted on said main support frame; a drum picking frame mounted on said main support frame; height adjusting means for selectively adjusting the height of said picking frames on said main frame; and transverse adjustment means for selectively moving said picking frames toward and away from each other and said picking path, said disk picking frame rotatably mounting said disk support members for movement therewith toward and away from said picking path and said drum picking frame rotatably mounting said drum support members for movement therewith toward and away from said picking path.

6. The poultry picking machine of claim 5 further including secondary height adjustment means for selectively adjusting the height of said disk support members relative to said drum support members.

7. The poultry picking machine of claim 6 further including disk axis pivot means for selectively pivoting said disk rotational axes about disk pivot axes generally parallel to said picking path.

8. A method of defeathering poultry comprising the steps of:

successively conveying poultry along a picking path in a head lowermost position so that the poultry is suspended along a generally vertical axis and the vertical axis moves with the poultry along a generally vertical picking plane along the picking path;

engaging the poultry from one side of the picking path and the vertical picking plane with a plurality of sets of first resilient picking fingers rotating about a common rotational axis generally parallel to the picking path with each set of the first resilient picking fingers circumferentially spaced about and radially oriented with respect to the common rotational axis and with the sets of the first picking fingers axially spaced along the common rotational axis; and simultaneously engaging the poultry from the opposite side of the picking path and the vertical picking plane in opposition to the first picking fingers across the vertical picking plane with a plurality of sets of second resilient picking fingers rotating about a plurality of separate rotational axes axially spaced along the picking path and oriented generally normal to the picking path with each set of the second picking fingers arranged in a concentric circle about one of said separate rotational axes and with the second picking fingers in each set oriented generally parallel to the separate rotational axis.

9. The method of claim 8 wherein said sets of second resilient picking fingers are arranged in an upper row of sets and a lower row of sets so that each set of second picking fingers in said upper row of sets is arranged in a concentric circle about one of said separate rotational axes lying in a common upper plane and so that each set of second picking fingers in said lower row of sets is arranged in a concentric circle about one of said rotational axes lying in a lower common plane where the upper and lower common planes of said separate rotational axes in said upper and lower rows are generally vertically spaced and where said common rotational axis of said sets of first resilient picking fingers is generally centered between said upper and lower common planes of said upper and lower rows of said sets of second resilient picking fingers so that the first and second resilient picking fingers engage the poultry on opposite sides of the generally vertical picking plane in generally direct opposition with each other.

* * * * *